United States Patent [19]

Dizmang

[11] 4,441,849

[45] Apr. 10, 1984

[54] APPARATUS FOR HOISTING LOADS TO ELEVATED BUILDING LOCATIONS

[76] Inventor: Michael J. Dizmang, 905 Highway 332, Apt. 1503, Lake Jackson, Tex. 77566

[21] Appl. No.: 411,689

[22] Filed: Aug. 26, 1982

[51] Int. Cl.³ ........................ B60P 3/28

[52] U.S. Cl. ........................ 414/490; 254/325; 414/494

[58] Field of Search ............... 414/490, 494, 500, 608; 187/10, 2, 11; 254/276, 325, 334; 52/27, 749

[56] References Cited

U.S. PATENT DOCUMENTS

| | | | |
|---|---|---|---|
| 740,475 | 10/1903 | Serley | 187/10 |
| 1,041,020 | 10/1912 | Carstens | 187/10 |
| 3,671,015 | 6/1972 | Sullivan | 254/334 X |

FOREIGN PATENT DOCUMENTS

| | | | |
|---|---|---|---|
| 85698 | 9/1958 | Denmark | 414/494 |
| 1206130 | 12/1965 | Fed. Rep. of Germany | 187/10 |

*Primary Examiner*—Joseph E. Valenza
*Assistant Examiner*—Stuart Millman
*Attorney, Agent, or Firm*—Vaden, Eickenroht, Thompson, Bednar, & Jamison

[57] ABSTRACT

A light weight carriage having a flat bed and a pivotal ramp also includes a winch and counterbalance assembly is first hauled to the roof of a building or other elevated location. Gutter guards are then installed to the carriage and the ramp is placed in its supported inclined position. A separate platform or pallet to which a load is attached, and having a plurality of small wheels thereunder, is connected to the cable of the winch on the carriage and is winched up the wall of the building, over the gutter guards, over a wheel-protecting block on the ramp and into its final position on the ramp. The ramp is lowered and the assembly is used like a dolly to move the load to its final location.

9 Claims, 11 Drawing Figures

FIG. 1
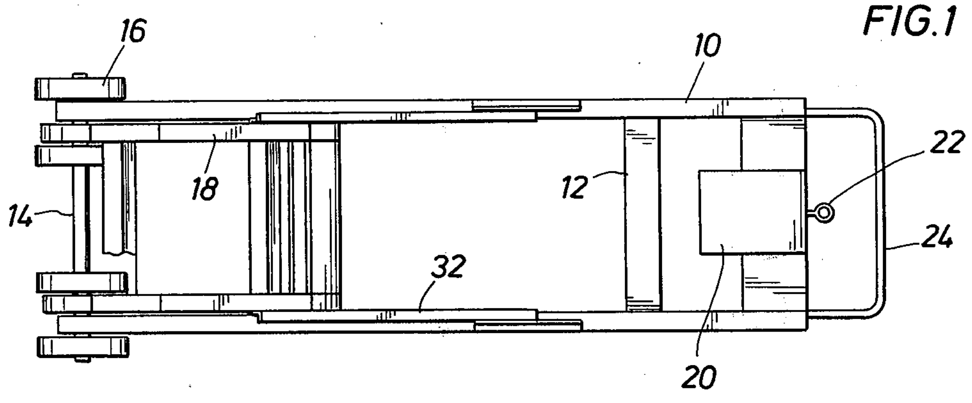
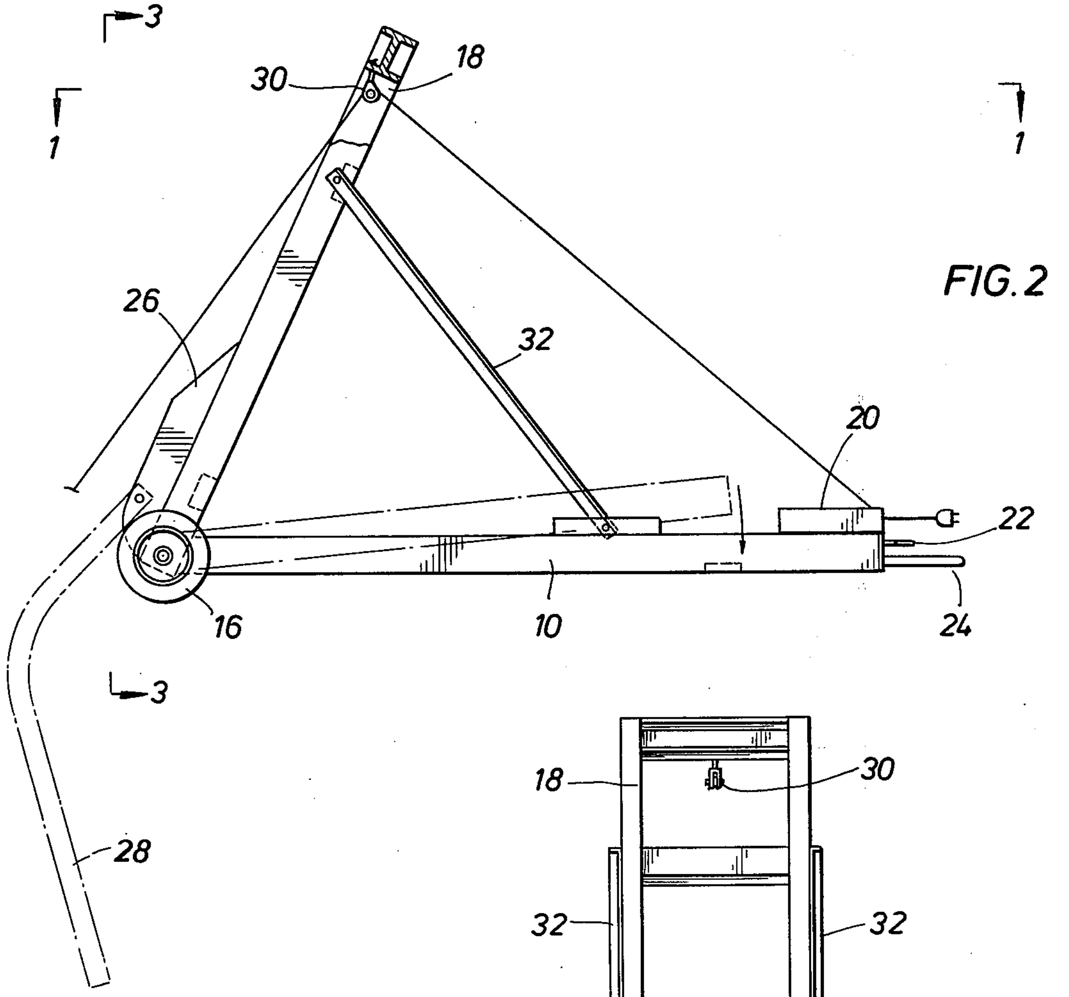
FIG. 2
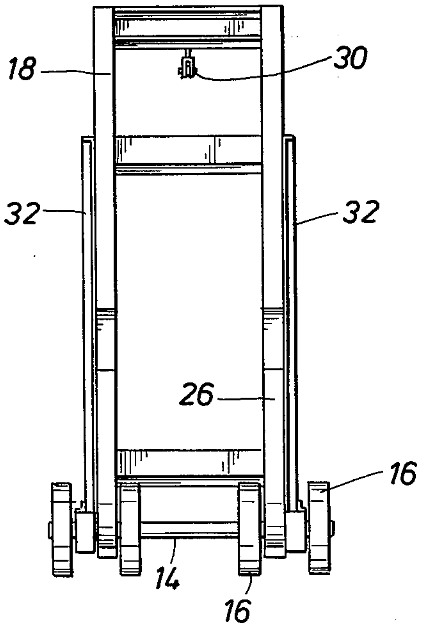
FIG. 3

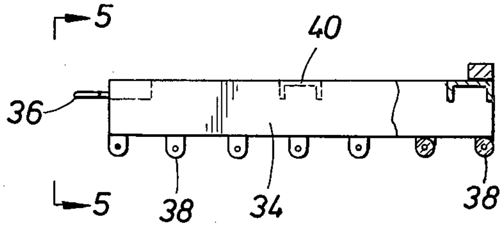
FIG. 4
FIG. 5
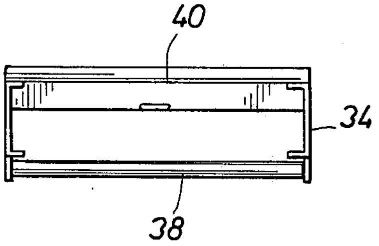
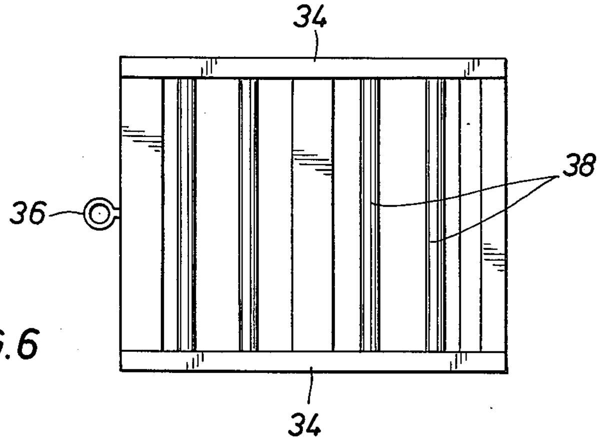
FIG. 6
FIG. 7
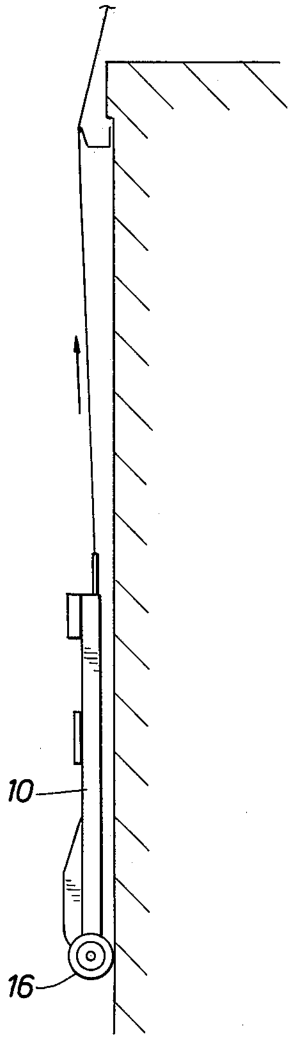
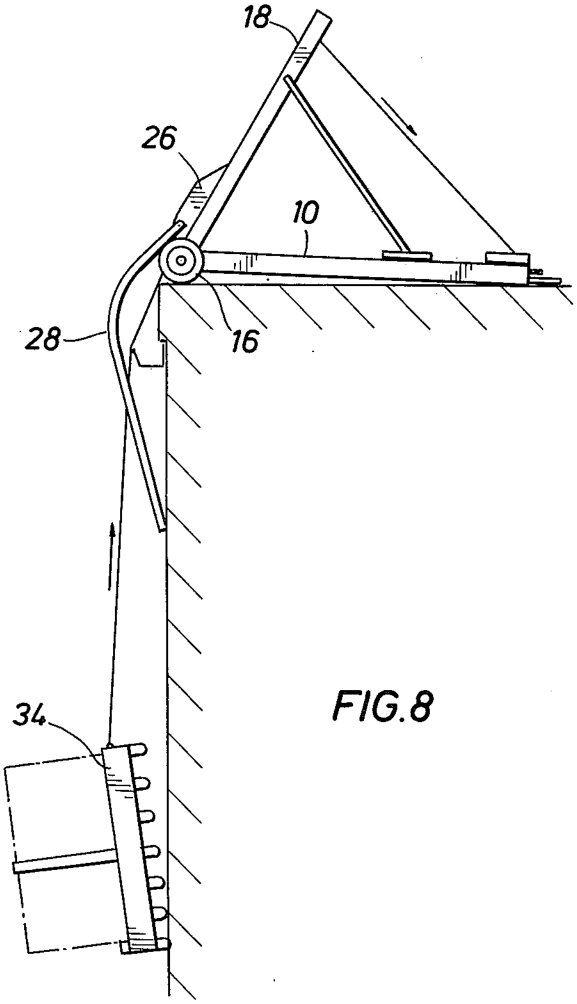
FIG. 8

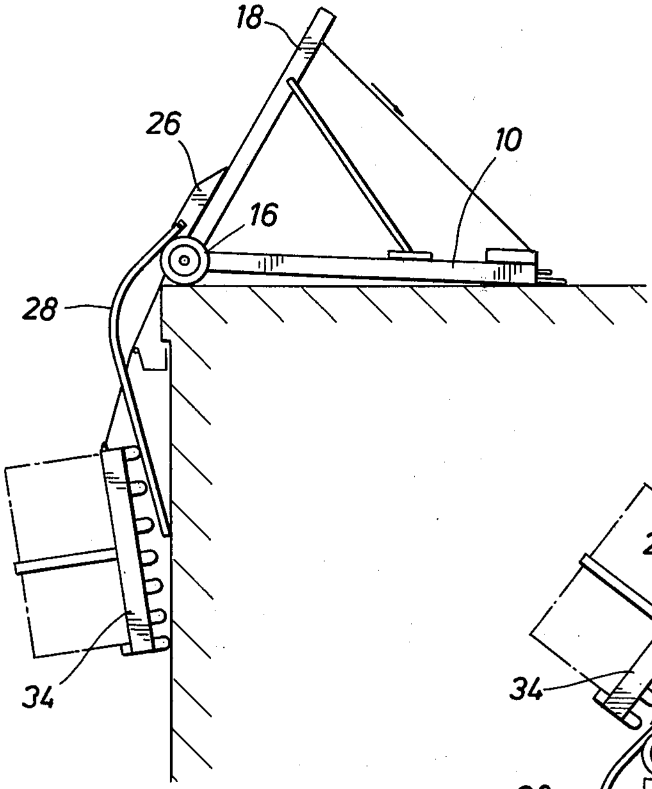
FIG. 9
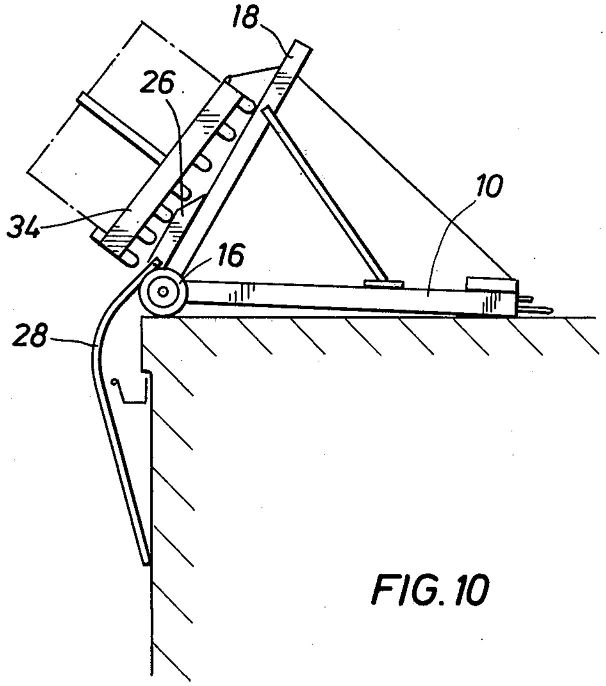
FIG. 10
FIG. 11
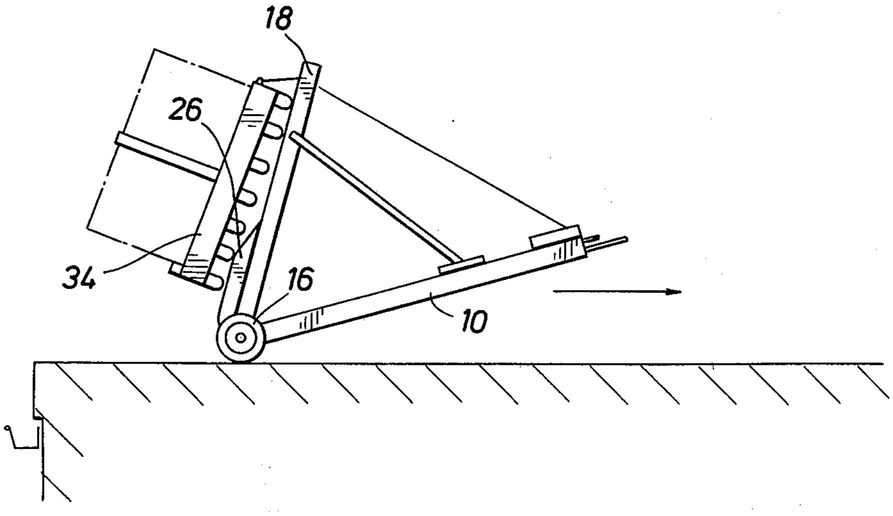

APPARATUS FOR HOISTING LOADS TO ELEVATED BUILDING LOCATIONS

FIELD OF THE INVENTION

This invention relates to hauling of items, such as air conditioning units and the like, to an elevated building location, typically the roof, and locating the items near the place where they are installed or otherwise used.

DESCRIPTION OF THE PRIOR ART

Air conditioning units weigh typically in the range of 300 pounds, which is far too heavy, as well as being too awkward, for a person to hoist the unit on his back and proceed up a ladder from the ground to the roof of a building. On a new construction job where there are cranes and other heavy equipment, then such equipment can be employed for performing the task just described. However, in many instances where the requirement exists to hoist and transport an air conditioning unit into position, there is no such heavy equipment. The construction job involves a two or three story apartment complex or the unit is being replaced on an already existing structure, for example.

When the workmen are met with the problem of raising a unit from the ground to the roof, they typically rig a pulley-and-winch arrangement on the roof. Because the requirement is temporary, the installation of the winch and even the sizing of the winch is not well-engineered. Sometimes a rope from the roof to the ground and brute strength is all that is used. Although it is obvious that such relatively crude means can be successful, it is also obvious that the winch-anchor can fail, the rope can break, the air-conditioning unit can be damaged by swinging against the building and at least two persons are required to lift the unit to the roof location. After the unit is on the roof, it then takes additional muscle and/or an auxiliary dolly to move the unit from its location at the top of the ascended wall to its installation location.

One lifting device known to applicant which is employed involves a telescoping tower support structure and a winch arrangement thereon counterbalanced by the weight of an operator. Such structure is not only cumbersome and expensive, the use of the tower is slow and it has even been known to tip. Once the unit is raised, then it takes a second operator to disconnect the unit. It also takes additional means or brute strength to carry the unit to its installation location.

Therefore, it is a feature of the present invention to provide an improved combination carriage and load pallet or platform device which is easily manipulated by one person for hauling such loads as air-conditioning units from the ground to a roof or other elevated building location.

It is another feature of the present invention to provide an improved apparatus for hauling loads to an elevated building location that also includes the capability of being converted into a dolly for immediately transforming the load to its desired location of use.

SUMMARY OF THE INVENTION

The invention embodiment disclosed herein includes two main parts, namely, a carriage and a platform. The carriage is normally made of light-weight aluminum, but sturdy enough to perform the task hereafter described, and has wheels on one end and a handle on the other. A ramp is pivoted at or near the wheel end and a winch unit is located near the handle end. A support is connectable to the ramp in its inclined position, the ramp having two positions, namely, its collapsed position and its inclined position.

The platform is a suitably sized pallet compatible with the carriage and having a plurality of rollers on its underneath side. The platform is suitable for carrying an air-conditioner or similarly sized and heavy load.

In use, the ramp of the carriage is in a collapsed attitude and the carriage is easily hauled to the roof or other elevated location. The wheels of the carriage may encounter the wall, but the weight distribution is such that the rest of the carriage does not. The carriage is secured for safety sake by one or more anchor ropes and the ramp is put in its supported inclined position. Suitable gutter guards are connected into a guide block on the front of the ramp (which block ensures that the wheels on the carriage are protected from contact by the platform). A cable from the winch on the carriage is paid out and connected to the platform on which the load has been mounted. The winch is then operated until the platform rolls up the wall, over the gutter guards, over the guide block on the ramp and comes to rest on the ramp. In this position, the weight distribution of the load, the angle of the incline of the ramp and the counterbalance location and weight of the winch and frame of the carriage is such that the carriage at no time tips the back end up from its level position.

The support is then disconnected from the ramp, the gutter guards are removed and the ramp is collapsed with the platform and load still in position. The entire assembly is then usable as a dolly to wheel the unit to its installation or other use location.

The winch on the carriage can either be electrically or mechanically driven. Electricity is generally available for most uses of the apparatus just described for operating the air-conditioning unit that is the subject of lifting and installation.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a typical embodiment of the invention and are therefore not to be considered limiting of its scope for the invention may admit to other equally effective embodiments.

In the Drawings:

FIG. 1 is a top view of the carriage portion of a preferred embodiment of the present invention.

FIG. 2 is a side view of the embodiment of the carriage shown in FIG. 1.

FIG. 3 is a front view of the embodiment of the carriage shown in FIGS. 1 and 2.

FIG. 4 is a side view of the platform portion of a preferred embodiment of the present invention.

FIG. 5 is an end view of the platform embodiment shown in FIG. 4.

FIG. 6 is a top view of the embodiment of the platform shown in FIGS. 4 and 5.

FIG. 7 is an action view of lifting carriage in accordance with the present invention to a position of use.

FIG. 8 is an action view of lifting a platform with a load in accordance with the present invention to a position of use.

FIG. 9 is an action view of lifting a platform with a load in accordance with the present invention at the location of the gutter guards.

FIG. 10 is an action view of the platform on the ramp of the carriage as the platform is drawn thereon.

FIG. 11 is an action view of the platform and carriage as the load carried thereon is taken to its final installation location.

DESCRIPTION OF THE PREFERRED EMBODIMENT

Now referring to the drawings, and first to FIG. 1, the carriage portion of the preferred embodiment of the invention is shown from the top view. The flat bed of the carriage is comprised preferably of 3-inch aluminum channel members 10 braced together with appropriate cross pieces 12 and including an axle 14 at its front end on which rubber ball bearing wheels 16 are located inside and outside of channel members 10. The wheels are preferably seven inches in diameter. The axle is preferably one-half inch in diameter and the wheels are mounted on the axles using flat washers and cotter pins in a conventional matter. The overall width of the bed in a preferred embodiment is 18 inches and the overall length of the bed is 60 inches.

Pivoted at the front end of the bed just described is ramp 18. The ramp is pivoted on the axle from a flat or fold up position. This is shown in dotted section and by an arrow in FIG. 2 to show that the ramp completely collapses within channel members 10 of the carriage. This collapsed position is the position of the ramp during the lifting procedure to be described hereinafter.

Also located on the bed at the rear end thereof is a platform on which a winch system 20 is located. The winch may be mechanically driven by a hand-crank or preferably by an electric motor as shown, again as hereinafter explained. An eye bolt 22 is located at the rear end of the bed. A tubing handle 24 is also located at the rear end of the bed, the tubing dimension being preferably 1-inch in diameter.

Located on either side of the lower portion of ramp 18 is a guide block 26 to which is secured gutter guards 28 for a purpose which is explained below. It should be noted, however, that the guide blocks are dimensioned so that the gutter guards are positioned so as to be at least somewhat external to wheels 16. Such dimensioning provides protection of these wheels against contact by the platform in the use which is hereinafter described. The relationships of the parts just described are shown from the front or end view perspective in FIG. 3.

Finally, it may be seen that the cable from winch assembly 20 passes through a cable pulley anchor 30 which is attached to the top "I" beam frame section of the ramp 18. The ramp is also supported in the position shown in FIG. 2 by brace 32, which is preferably 36 inches long, and 1½ inches wide. Brace 32 also is preferably of channel construction and is bolted at one end on bed strut 10 and at the other end to one of the channel struts of ramp 18. The approximate angle of the ramp to bed in the configuration shown in FIG. 2 is 65°. The dimension of the ramp is preferably approximately 48 inches.

Now referring to FIG. 4, a side view of the platform or pallet portion of the invention is illustrated. The platform is of a two inch channel rib construction and is approximately 33 inches in its outside width dimension. The front part of platform 34 includes an eye bolt 36 and a plurality of steel ball bearing rollers 38 located preferably on approximately six inch centers. Strap slots 40 permit the use of straps for holding a load on the top of the platform.

It may be seen by looking at FIGS. 5 and 6 that the platform is wider than the carriage assembly illustrated in FIG. 1 so that when the platform is pulled onto the ramp, the rollers ride over the side braces and the sides of the platform are located on either side of the ramp.

In operation to lift a load, typically an air conditioning unit, to the roof of a building the carriage is first hauled to the top of the roof by a line connected to eye bolt 22. As shown in FIG. 7, the wheels of the carriage come in contact with the vertical wall and the location of the line used for hoisting keeps the opposite end of the carriage away from the wall so that no contact is made except at the wheels.

Once the carriage is located on the roof, ramp 18 is pivoted to the position shown in FIG. 8 and brace 32 is secured in place. Generally "L"-shaped gutter guards 28 are connected to protect the gutter at the top of the roof, the lower portion thereof coming in sloping contact with the vertical wall of the building. Next, the cable connected to the winch on the carriage is extended through the cable pulley anchor on the top of the ramp and lowered for connection to platform 34. Previously, the load has been strapped to the platform via strap slots on platform 34. Next, platform 34 is lifted via the cable and winch connection using eye bolt 36 on the platform. The lowest steel ball bearing roller and one or two above the lower most roller provide a rolling contact for platform 34 with respect to the vertical wall. It should be noted that the lifting cable which extends over the gutters lift the top end of the platform at a distance which is away from the vertical wall. Although some swaying may occur, it should be noted that only the steel ball bearing roller part of platform 34 comes in contact with the vertical wall.

FIG. 9 shows the platform location as it nears the top of the vertical wall. In the position illustrated, the top most roller of platform 34 comes in contact with the lower surface of the "L" shaped gutter guards which protects damage to the gutters as the platform is thereby raised up over the gutters on the guards until they come into contact with the guide blocks on the lower end of the ramp. Please note that the guide blocks prevent the ball bearing rollers on the bottom of the platform from coming into contact with the rubber threads of wheels 16 of the carriage.

When the platform is winched to the top of the ramp, it should be noted that the weight distribution and length of the bed member and the angle of the ramp are all such that the carriage does not tip forward, but the back of the carriage stays in position so that the bed is level at all times. It is possible to use the eye bolt located at the rear of the cable for anchor lines so as to prevent the carriage from inadvertently being pushed forward over the edge of the roof; however, such anchor lines are not necessary since there is no forward moment or impetus given the carriage in the use which has just been described.

The handle provides means for walking the carriage forward to the position of eventual installation. In another use mode, it is possible to disconnect brace 32 and allow ramp 18 to be folded back to the position which appears in FIG. 7 with the load and platform in location on the ramp. At the same time the ramp is preferably lowered and the winch is operated again so as to tighten the line. However, the carriage can be easily walked in the position shown in FIG. 11 without the ramp being collapsed. The load is then removed at the location of the installation and the installation is completed as required for the unit.

Please note that it is common that the load which is lifted to the roof in the manner just described is an air conditioning unit and that the installation is suitable for installing the unit at a location where there is electricity available. This being the case, it is ordinarily possible to use an electric winch. For installations where electricity is not available, or at the preference of the operator, a hand operated winch may be used. That is, the preferred embodiment includes a winch which is motor driven by an electrical connection made on the roof of the building. The winch assembly can also include an auxiliary counterbalance to provide the operation which has been described if the weight of the winch alone is not sufficient for that purpose.

Although the description has been made with respect to a roof installation, it is possible to use the carriage and platform apparatus which has just been described to hoist loads to balconies and other locations other than a roof.

The gutter guards are illustrated and have been described as each being an "L"-shaped angle bracket. It should be noted that the angle is not sharply pointed since it is only necessary to provide means for insuring that the platform and load ride on the gutter guards so as not to contact the gutters which they protect.

It also should be noted that the preferred embodiment which has just been described has been described with respect to mostly an aluminum channel frame construction. However, the carriage and platforms may be made of wood or some other convenient material.

Therefore, although only a single basic embodiment has been shown, it will be understood that the invention is not limited thereto since many modifications may be made and will become apparent to those skilled in the art.

What is claimed is:

1. Apparatus for lifting and transporting a load to an elevated building location, comprising an elongated carriage having a flat bed with at least two wheels on a first end thereof and a cable connection on the second end thereof to provide for hauling of the carriage up a vertical wall of the building, the balance of the carriage being such as to cause the wheels on said first end to be closer to the wall structure than said second end, a ramp pivoted near said first end with a collapsed position during the time said carriage is hauled up the building wall and an inclined position after the carriage is at an elevated building location near the edge of the wall, connectable support means for holding said ramp in its inclined position, a platform for carrying said load and having a cable connection for hauling said platform and load up the vertical wall of the building and onto said ramp of said carriage, said weight on said ramp, the inclined angle of said ramp and the weight distribution of said flat bed of said carriage being such that the flat bed does not raise up from a level position when the platform and load are in position on said ramp.

2. Apparatus in accordance with claim 1, wherein said carriage includes retractable cable means near said second end of said flat bed having a cable connectable to said platform to provide hauling thereof and weight distribution counterbalancing of said carriage.

3. Apparatus in accordance with claim 2, wherein said retractable cable means includes a mechanical winch.

4. Apparatus in accordance with claim 2, wherein said retractable cable means includes an electric motor-driven winch.

5. Apparatus in accordance with claim 1, and including gutter guards for providing a guard ramp over the top lip of the wall and onto said ramp for said platform.

6. Apparatus in accordance with claim 5, wherein said ramp includes a guide block on its lower end to provide connection for said gutter guards in such a manner that said platform does not contact said wheels on said flat bed.

7. Apparatus in accordance with claim 1, wherein said platform includes a plurality of wheels for rolling up the side of the building and onto said ramp.

8. Apparatus in accordance with claim 1, wherein said frame structures for said carriage flat bed and ramp are aluminum.

9. Apparatus in accordance with claim 1, wherein said second end of said flat bed includes a handle for operating said carriage like a dolly when the load is on said ramp and said ramp is again in its collapsed position.

* * * * *